May 19, 1970

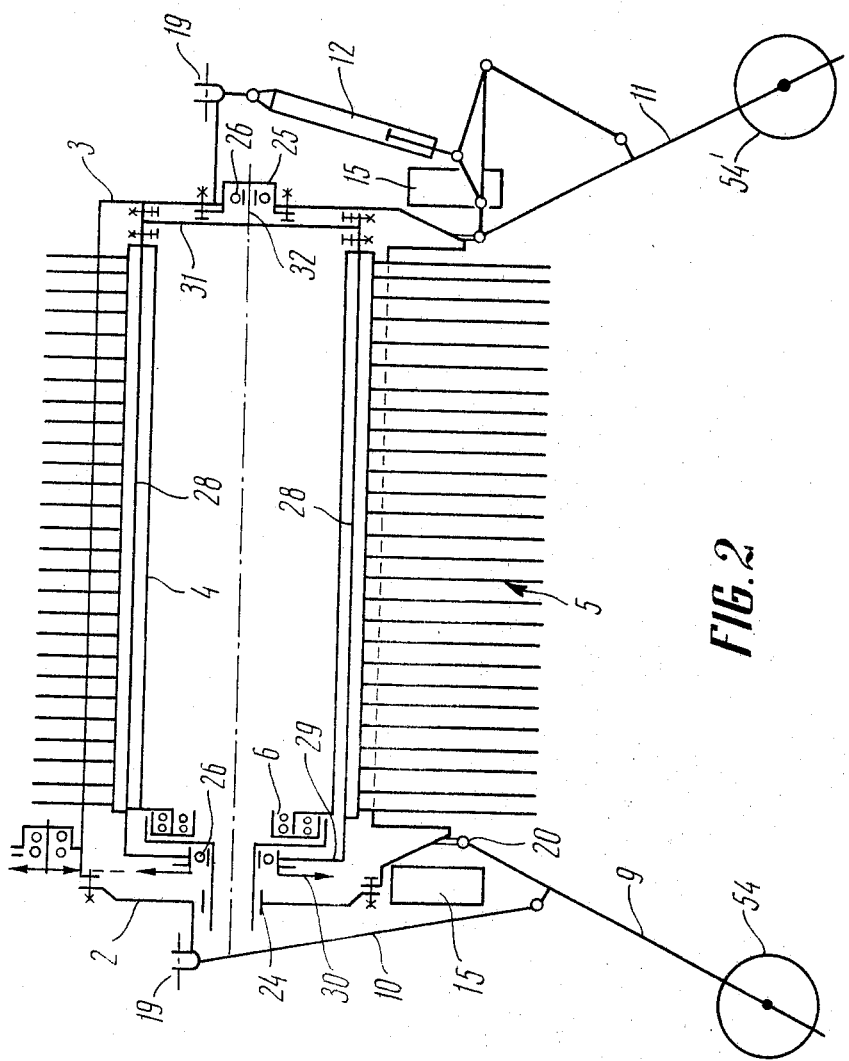

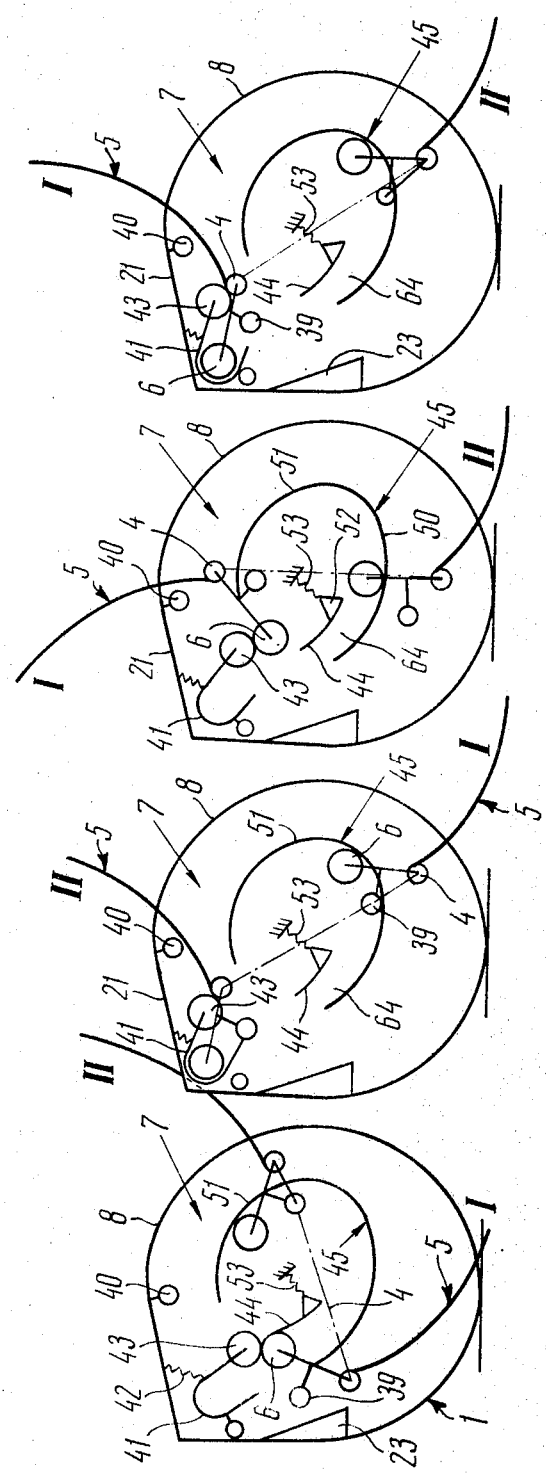

I. F. KONDRATIEV ETAL 3,512,349

DEVICE FOR THE PICKING UP AND LOADING
OF LUMP AND FIBROUS MATERIALS

Filed April 26, 1967

United States Patent Office 3,512,349
Patented May 19, 1970

3,512,349
DEVICE FOR THE PICKING UP AND LOADING
OF LUMP AND FIBROUS MATERIALS
Igor Fedorovich Kondratiev, Jurievsky per. 9, kv. 1;
and Nikolai Ivanovich Bondarenko, 3 Zhuravlevsky
viezd 7, Kharkov, U.S.S.R.; Afanasy Petrovich Malik,
Ul. Moskovskaya, 10, kv. 25, Dnepropetrovsk,
U.S.S.R.; Pavel Yakovlevich Laiko, Ul. Jumtovskaya
62, Kharkov, U.S.S.R.; Daniil, Ilich Taran, Ul. Dne-
propetrovskaya 2-B, kv. 12, Dnepropetrovsk, U.S.S.R.;
and Antonina Vasilievna Lonschakova, Ul. Juzhno-
proektnaya 28-a, kv. 2; Vera Mikhailovna Snur-
nikova, Ul. Revoljutsii 5, kv. 28; and Alexandr
Semenovich Adonkin, Ul. Balkanskaya 14, all of
Kharkov, U.S.S.R.; Ivan Mikhailovich Ruzin, Ul.
Kovaleriiskaya 40, kv. 2, Dnepropetrovsk, U.S.S.R.;
Jury Mstislavovich Zalesky, Juzhny, ul. Gagarina
72, Kharkovskaya obl., U.S.S.R.; Pavel Lvovich
Novikov, Ul. Tereshkovoi 2, korpus 3, kv. 50, Odessa,
U.S.S.R.; Alexandr Grigorievna Kiteleva, Tara-
sovsky per. 42, kv. 6, Kharkov, U.S.S.R.; Viktor
Fedorovich Konjuk, Ul. Chernyakhovskogo 20-B, kv.
7, Odessa, U.S.S.R.; and Mikhail Maximovich Kuche-
renko, Alexandria Parkovy per. 14, kv. 15, Kirovo-
gradskaya obl., U.S.S.R.
Filed Apr. 26, 1967, Ser. No. 633,733
Int. Cl. A01d 89/00
U.S. Cl. 56—364    11 Claims

ABSTRACT OF THE DISCLOSURE

A pick-up and loading device for lump and fibrous materials comprises a rotatable frame mounted on a body and supporting a toothed fork member which carries a supporting roller which travels in an open channel guide during rotation of the frame and passes into a U-shaped guide in an uppermost position when the fork member is retained by a stop and urged thereby into the U-shaped guide.

This invention relates to the devices for picking up and loading lump and fibrous materials mainly used in agriculture for handling root vegetables, tubers, corn cobs, strawy mass, etc.

Known in the art are devices for picking up and loading lump and fibrous materials, for example, root vegetables and tubers, in which a picking up tool having the shape of a fork with a supporting roller is hinged to a turnable frame, said fork with the aid of a guide and a fork reversing mechanism, penetrating under the material while moving along a trajectory which is close to a horizontal straight line, following which said fork lifts the material through discharge strippers onto a sloping part (ref. Author's Certificate of the U.S.S.R. No. 166,544).

In the conventionally known devices, the fork reversing mechanism which retracts the fork to the initial position, corresponding to the commencement of the fork horizontal penetration under the material, is usually of a lever intermittent-action type.

A disadvantage of these devices is their low working capacity since the fork reversing mechanism is suitable for operation with one working member only (i.e., with one fork).

Another disadvantage of the conventionally known devices is that these devices fail to ensure sufficiently complete picking up of material from small heaps, small batches of material being pushed away by the fork.

In other conventionally known devices intended for the same application, for example, in the rotary vane devices, the vanes cannot move in the horizontal direction through the spaces between the discharge strippers in the lowermost position, due to which these devices damage the material in the course of picking up, and fail to ensure adequately complete picking up of the material.

An object of this invention is to provide a high efficiency device for the picking up and loading of lump or fibrous materials.

Another object of the invention is to provide a device which will ensure a more complete picking up and loading of both lump and fibrous material, for example, root vegetables, tubers, strawy mass and other similar materials.

In accordance with the above-specified and other objects, in the handling device invented by us the fork reversing mechanism comprises a movable U-shaped member fastened to the body of the device, a stop which retains the fork members in the uppermost position and ensures the interaction of the supporting roller with the U-shaped member when the frame is rotating, and an open channel oval-shaped guide whose open section faces the U-shaped member, said guide being intended for retaining the fork members, with the aid of the supporting roller, when the fork members are being forced under the material and during their subsequent lifting.

The oval guide is preferably located inside the movable frame, at one of the sides thereof.

The U-shaped member is preferably provided with a roller, ensuring the passage of the movable frame at the U-shaped member.

It is also preferable that the fork member be equipped with additional rollers interacting with a fixed thrust strap mounted on the body of the device, when the supporting roller of the fork enters the guide.

The guide can be hinged inside the oval guide and can be spring-loaded in the uppermost position.

Other objects and advantages of the invention will be apparent from the following description in connection with which certain embodiments of the invention have been shown in the accompanying drawings in which:

FIG. 2 is a diagrammatic view of the pick-up;

FIGS. 3, 4, 5 and 6 show the fork members of the device in various positions, at the stages of the fork members penetrating under the material, their lifting, swinging and reversing to the lowermost position for subsequent horizontal penetration;

The design of the device for picking up and loading lump and fibrous materials will be more readily understood in the course of describing its exemplary embodiment.

Figure 1:
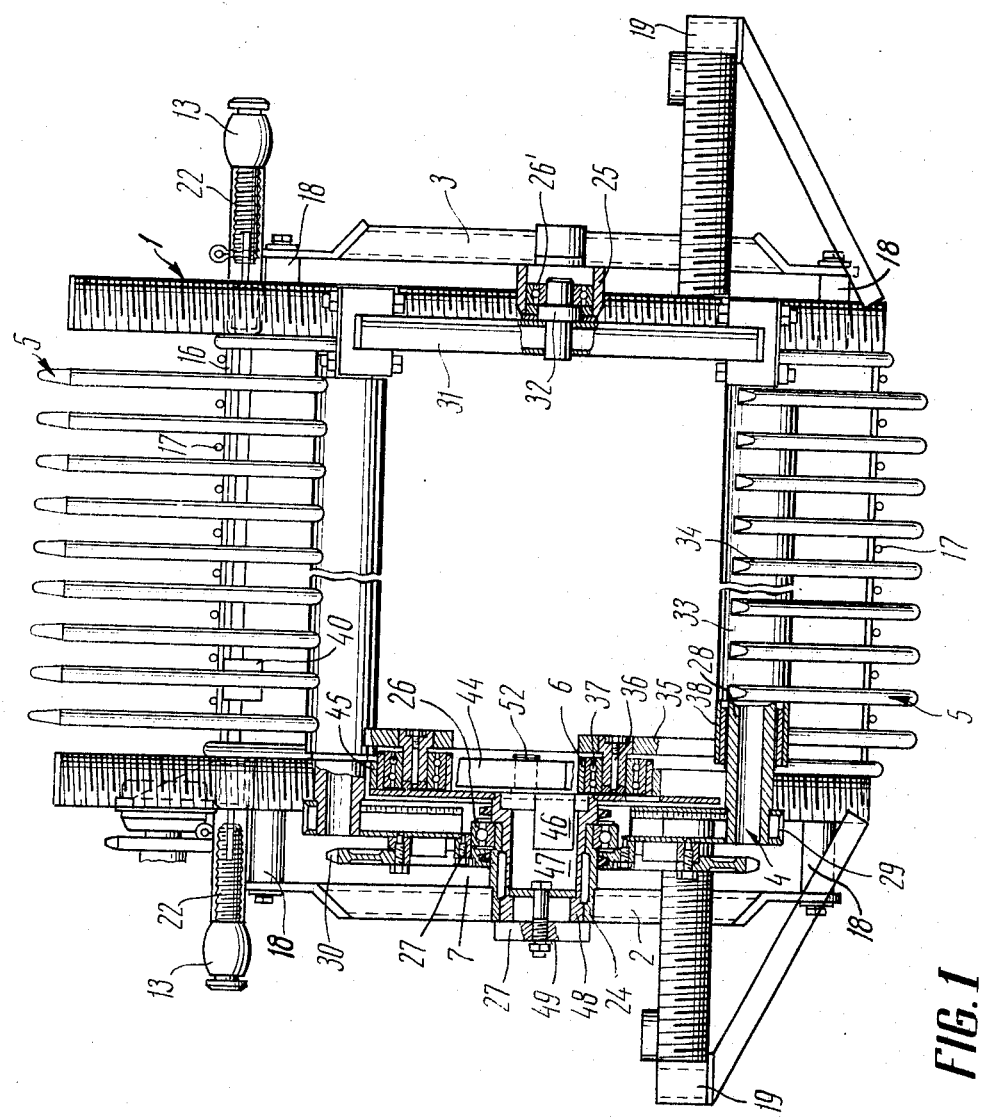
FIG. 1 is a front sectional view of the device according to the invention.

The device according to the present invention comprises a body 1 (FIG. 1), supports 2 and 3, a rotatable frame 4 pivoted in the supports 2 and 3, fork members 5 with rollers 6, said fork members being pivoted to the rotatable frame 4, a fork reversing device 7 which retracts the fork members 5 to the initial position, discharge strippers 8 installed in the front part of the body 1, the fork members 5 being located in the gaps between said strippers, a guide plate 9 (FIG. 2) with an adjustment link 10, an active plate 11 with a hydraulic cylinder 12, two rollers 13 (FIG. 1) for attachment of the device to a vehicle, two hydraulic cylinders 14 (FIG. 7) for effecting the lifting and lowering of the device, respectively, to the transportation and working position, and two adjustable roller supports 15 which are fastened to the body 1 (FIG. 2).

The body 1 of the device includes upper and lower channel strips 16 (FIG. 1) with lugs 17 for fastening the discharge strippers 8. On the sides of the body 1 there are lugs 18 for fastening the supports 2 and 3 of the turnable frame 4 to body 1. The front part of the body 1 is provided with brackets 19 for fastening the hydraulic cylinders 14 (FIG. 7) which effect the lifting of the device, as well as with the adjustable link 10 (FIG. 2) and the hydraulic cylinder 12. The guide plate 9 and the active plate 11 are hinged by means of brackets 20 (diagrammatically shown in FIG. 7). The upper part of the body 1 has a sloping section 21 intended for unloading the material from the fork members 5 and from the discharge guides 8.

In the rear part of the body 1 there are brackets 22 (FIG. 1) for receiving the rollers 13. On the right-hand side of the body 1 there are brackets (not shown in the drawing) for the installation of the fork reversing device 7, and a thrust strap 23 (FIGS. 3–6). Fastened to the bottom part of the body 1 on both sides thereof are brackets (not shown in the drawings) for the installation of the supporting rollers 15.

The supports 2 and 3 (FIG. 1) of the device are installed on the sides of the body 1 on the respective lugs 18. The support 2 has a hub 24, and the support 3 has a hub 25 for the installation of bearings 26 and 26' for supporting the rotatable frame 4. The hub 24 of the support 2 has splined lugs 27. The supports 2 and 3 are made removable, which ensures quick dismantling and mounting of the device.

The rotatable frame 4 is of a welded design and turns on the bearings 26 and 26' of the supports 2 and 3. The frame 4 consists of two longitudinal tubes 28, a rigid side member 29 with a hub and a sprocket 30 fastened to said side member 29, and a removable side member 31 with an axle 32, intended for fitting the fork members 5 on the longitudinal tubes 28 of the frame 4.

Since there is no central shaft in the rotatable frame 4, the length of the fork members 5 can be made approximately equal to the width of the gap between the longitudinal tubes 28 of the frame 4.

The fork members 5 of the device are made as a welded structure made of tubes 33 and comprising teeth 34 welded to said structure at equal distances from each other, a bracket 35 fixed on tube 33 with an axle 36 and the supporting roller 6 running on bearings 37, sliding bearings 38 on the ends of the tube 33 and an additional roller 39 secured to bracket 35 (FIGS. 3–6) interacting with the fixed thrust strap 23 of the body 1. The device 7 for reversing the fork members 5 cooperates with a stop 40 intended for retaining the fork members 5 in the uppermost position and the stop is essentially a rubberized cylindrical roller rotatably mounted on a stub shaft on the body 1 of the device. The device 7 consists of the supporting rollers 6 of the fork members 5, a U-shaped member 41 with a spring 42 and a roller 43 pivoted to the body 1 of the device and retaining the supporting roller 6 when the fork members 5 are turning, with the frame 4 in rotation.

The roller 43 is intended for retracting the U-shaped member 41, to allow unobstructed passage of the longitudinal tubes 28 of the frame 4.

The fork reversing device 7 comprises the additional rollers 39 mounted on the fork members 5 in such a way that, when said rollers interact with the fixed thrust strap 23 fastened to the body 1 of the device, the supporting rollers 6 are caused to move from the U-shaped members 41 to a guide 44.

The guide 44 and an oval-shaped guide 45 are located on a disc 46 (FIG. 1) provided with a hub 47 which is fastened in the hub 24 of the support 2. The hub 47 has splined lugs 48 which are connected to the splined lugs 27 and with the aid of a cross-member 49.

The oval-shaped guide 45 is essentially an open channel member of a rectangular cross-section, welded to the disc 46 and intended for retaining the supporting roller 6 of the fork members 5.

The oval-shaped guide 45 has a penetration section 50 (FIGS. 3–6) and a lifting section 51 to effect the respective operation of the fork members 5.

The guide 44 is pivoted to the disc 46 (FIG. 1) with the aid of an axle 52 and is spring-loaded by means of a spring 53 (FIGS. 3–6) in the uppermost position.

The guide 44 is intended for retaining the supporting roller 6 at the commencement of the penetration of the fork members 5 under the material.

The stop 40 can be made in the form of a spring-loaded or resilient member, because this has no essential influence on the functioning of the device. The guide 44 is made movable and is spring-loaded in order to ensure that the supporting roller 6 of the fork members 5 will move out of and into the gap in the guide 45.

The guide 44 can be provided with an additional spring or other resilient member acting in the direction opposite to the direction of force application of the spring 53, in order to cushion the impact of the supporting roller 6 when coming down on the guide 44. The discharge guides 8 are circular steel rods arched so as to ensure the sliding down of the material lifted by the fork members 5, said rods being fastened to the body 1 by means of the bushings 17.

The discharge strippers 8 are arranged between the teeth 34 (FIG. 1) of the fork members 5, and are intended to protect the device from the ingress of the handled material.

The discharge strippers 8 may be made of any other resilient material of appropriate cross-section to ensure the requirement of ready sliding down of the handled material in the course of lifting.

The guide plate 9 (FIG. 2) is intended for increasing the working width of the device and for guiding the material to the fork members 5.

In accordance with the condition of the material to be handled and the nature of the soil, the angle of installation of the plate 9 can be varied with the aid of the adjustable link 10.

In front of the plate 9 there is a disk-shaped support 54 (shown in FIGS. 2 and 7 only) which follows the contour of the field. The plate 9 is hinged to the brackets 20 of the body 1.

The active plate 11 is fastened in a similar way on the opposite side of the body 1 but is controlled by the hydraulic cylinder 12.

The active plate 11 is intended for increasing the working width of the machine when picking up hay, and for raking up the material left on the ground towards the fork members 5. In order to follow the contour of the ground, the plate 11 also has a disk-shaped support 54' (shown only in FIG. 2).

The fork reversing device is fastened to the frame 55 (FIG. 7) of the loader by means of two rollers 13 (FIG. 1) secured to brackets 56 (FIG. 7) of the frame 55 by engagement in slots 57 therein, owing to which the device following the contour of the ground surface can freely move in the vertical direction.

Figure 7:
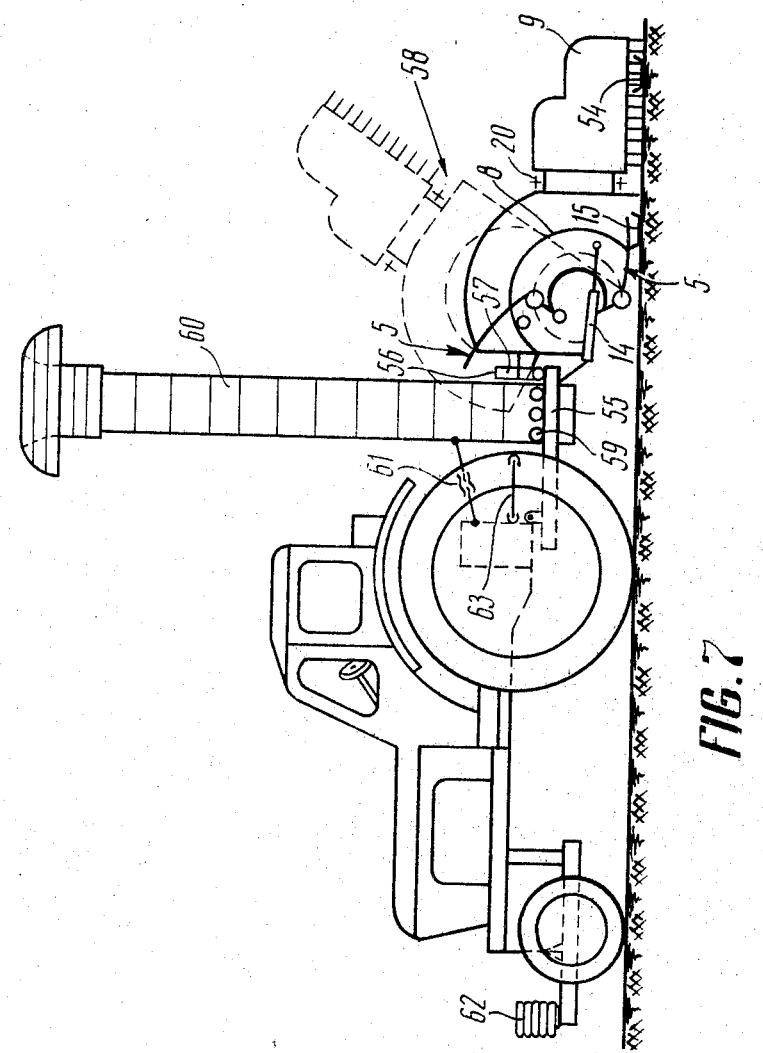
FIG. 7 shows the device of the invention operated in conjunction with a cleaner and a discharge elevator, mounted on a tractor (side view), the broken line showing the transportation position of the device.

The control of the position of the device in operation, and the lifting of the equipment to the transportation position are pivoted as shown in FIG. 7 with the aid of two hydraulic cylinders 14 pivoted to the frame 55 and to the brackets 19 (FIG. 2) of the body 1.

The device is capable of following the contour of the ground with the aid of two adjustable supporting runners 15 located on both sides of the body 1, and two disk-shaped supports 54 and 54' mounted on the plates 9 and 11.

If it is desirable to vary the depth of penetration of the fork members 5 within a wide range, the section 50 (FIGS. 3-6) of the guide 45 can be made adjustable.

Figure 8:
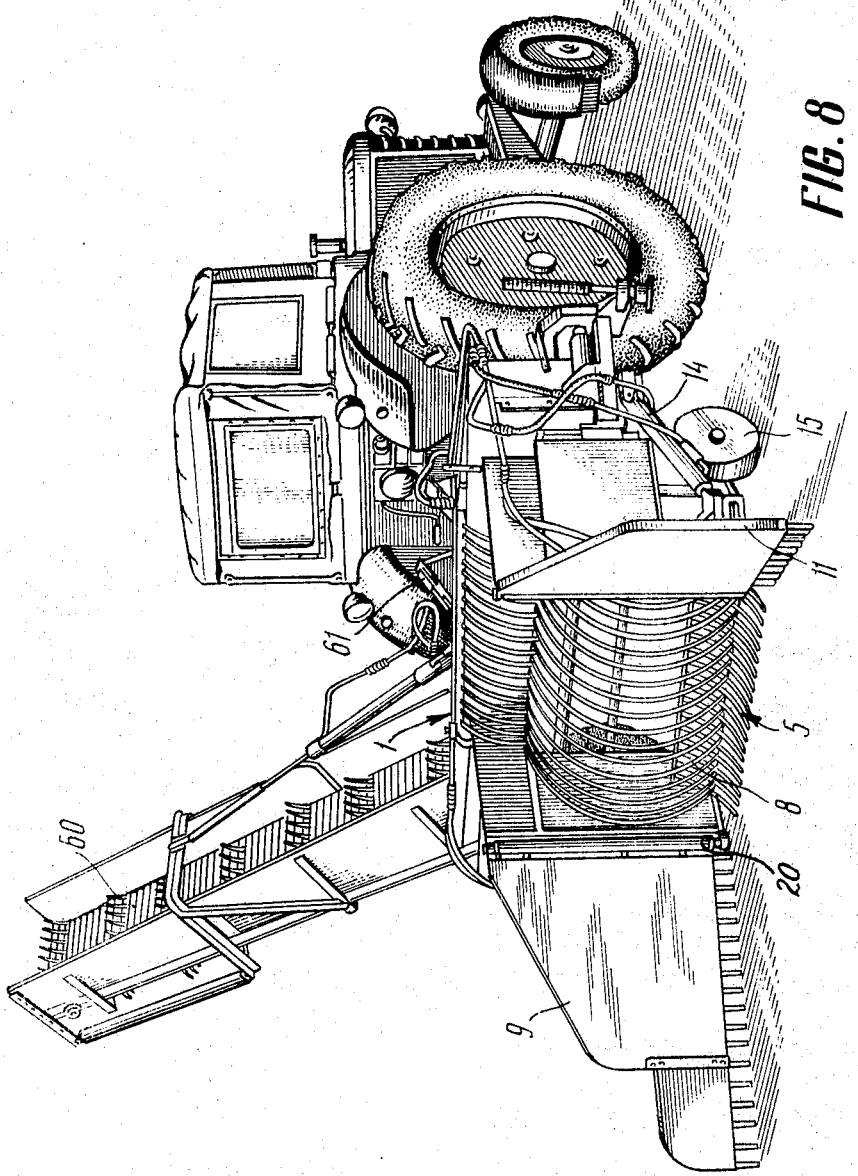
FIG. 8 is a general perspective view of the device of the present invention.

The cleaner-loader (FIGS. 7, 8) as a whole is suitable for mounting on tractors of various types and models, and comprises the following working members and mechanisms: a material picking and lifting device 58, a cleaner 59, a discharge elevator 60 mounted on the frame 55 of the loader, a hinge device 61, a counterweight 62 ensuring the stability of the moving machine, the hydraulic cylinders 14 for controlling the working position of the working members and for lifting them to the transportation position, and the drive mechanism 63 which transmits the torque from a power take-off shaft of the tractor to the working members.

The operation of the device according to the invention will be understood from a consideration of FIGS. 3, 4, 5 and 6. The rotatable frame 4 (FIG. 3) whose longitudinal sides carry the free-mounted fork members 5 is set in rotation by means of the sprocket 30 (FIG. 1) from the drive 63 of the loader. In this position the fork members 5 (FIG. 3) are prevented by the supporting roller 6 from free rotation on the longitudinal sides of the frame 4, said roller 6 resting on the guide 44 and the guide 45.

In the course of further rotation of the frame 4 the roller 6 passes over the slotted section 64 and guides the fork members 5 through the spaces between the discharge strippers 8 under the material, while the supporting roller 6 rolls through the slotted section 64 and further along the guide 45. In this position, the fork members 5 move along a trajectory close to a horizontal straight line.

When the roller 6 enters the concentric section 51 of the guide 45 (FIG. 4) the fork members 5 move upwards thus lifting the material located between the fork members 5 and the discharge guides 8.

In the uppermost position the fork members 5 having encountered the stop 40 come to rest, and the material is dumped on the sloped part 21 (FIG. 5). Following further rotation of the frame 4, the roller 6 having passed the guide 44 enters the guide 45, while the stop 40 retains the fork members 5 and ensures that the supporting roller 6 enters the U-shaped member 41. Now the spring 42 is compressed and the fork members 5 are retracted into the body 1. The roller 43 (FIG. 6) rolls along the longitudinal tube 28 of the rotatable frame 4 thus allowing the latter to move down.

The fork members 5 (FIG. 3) are completely retracted into the body 1 while the roller 6 moves out of the U-shaped member 41 and with the aid of the spring 42 is transferred by said U-shaped member onto the guide 44. Further, with the aid of the additional roller 39 and the fixed thrust strap 23 the roller 6 is guided to the slotted section 64 and the entire cycle of fork member penetration under the material and lifting is repeated. Since the frame 4 carries two fork members 5, one complete turn of the frame 4 corresponds to two picking up cycles performed by two fork members 5. The material dumped by the fork members 5 is transported along the sloped part 21 of the body 1 to the subsequent working members.

The cleaner-loader operates as follows. The tractor with the cleaner-loader mounted in position moves in the reverse run using a speed reduction unit, along the material to be handled. The device retained by two hydraulic cylinders 14 slides on the ground on four supports 15 and 54 thus following the contour of the field surface. The rotating fork members 5 pick up the material and place it on the sloped part 21 in turn, while the plates 9 and 11 guide the material to the fork members 5. The active plate 11 controlled by the hydraulic cylinder 12 ensures the division of the material and rakes up the material which is left to the fork members 5.

From the sloped part 21 of the device the material is admitted to the cleaning arrangement 59 where by means of two worm shaft pairs the material is finally cleaned of foreign matter (for example, soil, tops and unwanted vegetation) and transferred to the discharge elevator 60 which by means of a scraper chain lifts the material and dumps it into a transport vehicle.

The advantages of the device according to the invention consist in that said device possess a working capacity which is much higher than that of other similar devices known heretofore, while the material is picked up and loaded fairly completely, irrespective of the contour of the ground on which the handled material may be located.

Though this invention has been described herein with reference to the preferred embodiment thereof it will be understood that various modifications may be resorted to without departing from the spirit and scope of said invention, as those skilled in the art will easily understand.

We claim:

1. A device for the picking-up and loading of lump and fibrous materials, said device comprising a body, a rotatable frame, a picking up working member in the shape of fork members pivoted to said rotatable frame, a supporting roller fastened to said working member, a guide installed on said body of the device, a movable U-shaped member fastened to said body of the device, a stop for retaining the fork members in the uppermost position and ensuring the interaction of said supporting roller with said U-shaped member when said frame is in rotation, and an open channel guide which is fixed to said body of the device, said guide having an open section facing said U-shaped member, said open channel guide being intended for supporting the fork members, with the aid of said roller, when the fork members are being forced under the material and during the lifting thereof.

2. A device as claimed in claim 1, in which said open channel guide is located inside the movable frame, at one of the sides thereof.

3. A device as claimed in claim 1, in which the U-shaped member carries a roller ensuring the passage of the movable frame at said U-shaped member.

4. A device as claimed in claim 2, in which the U-shaped member carries a roller ensuring the passage of the movable frame at said U-shaped member.

5. A device as claimed in claim 1, in which the fork members are provided with additional rollers interacting with a fixed thrust strap installed on the body of the device, when the supporting roller of the fork members enters the open channel guide.

6. A device as claimed in claim 2, in which the fork members are provided with additional rollers interacting with a fixed thrust strap installed on the body of the device, when the supporting roller of the fork members enters the open channel guide.

7. A device as claimed in claim 3, in which the fork members are provided with additional rollers interacting with a fixed thrust strap installed on the body of the device, when the supporting roller of the fork members enters the open channel guide.

8. A device as claimed in claim 1, in which the first said guide is hinged inside the open channel guide and is spring-loaded.

9. A device as claimed in claim 2, in which the first said guide is hinged inside the open channel guide and is spring-loaded.

10. A device as claimed in claim 3, in which the first said guide is hinged inside the open channel guide and is spring-loaded.

11. A device as claimed in claim 5, in which the first said guide is hinged inside the open channel guide and is spring-loaded.

References Cited

UNITED STATES PATENTS

| | | | |
|---|---|---|---|
| 983,662 | 2/1911 | White et al. | 56—364 |
| 1,047,326 | 12/1912 | Stewart | 56—364 |
| 1,847,399 | 3/1932 | Innes | 56—364 |
| 2,256,829 | 9/1941 | Hyman | 56—364 |
| 2,388,212 | 10/1945 | McElhoe et al. | 56—364 |
| 2,508,401 | 5/1950 | Kirk | 56—130 |
| 2,664,692 | 1/1954 | Darlington | 56—330 |
| 2,780,905 | 2/1957 | Darlington | 56—330 |
| 2,783,605 | 3/1957 | Heleen | 56—330 |

RUSSELL R. KINSEY, Primary Examiner